United States Patent [19]
Le Goff et al.

[11] Patent Number: 5,899,092
[45] Date of Patent: May 4, 1999

[54] CHILLER

[75] Inventors: Pierre Le Goff, Nancy; Jérôme Dornier, Malzeville; Isabelle Soide, Ermont, all of France

[73] Assignee: Gaz de France, Paris, France

[21] Appl. No.: 08/947,752

[22] Filed: Oct. 9, 1997

[30] Foreign Application Priority Data

Oct. 10, 1996 [FR] France .................................. 96 12388

[51] Int. Cl.$^6$ ................................................. F25B 15/00
[52] U.S. Cl. ................................ 62/476; 62/485; 62/489
[58] Field of Search ........................ 62/101, 476–497, 62/484, 485, 489, 494

[56] References Cited

U.S. PATENT DOCUMENTS

| | | | |
|---|---|---|---|
| 3,831,397 | 8/1974 | Mamiya | 62/476 |
| 4,553,409 | 11/1985 | Furukawa | 62/476 |
| 4,606,404 | 8/1986 | Le Goff | 165/104.12 |
| 4,667,485 | 5/1987 | Ball et al. | 62/476 |
| 5,036,903 | 8/1991 | Shook | 165/133 |
| 5,284,029 | 2/1994 | Keuper et al. | 62/476 |

FOREIGN PATENT DOCUMENTS

| | | |
|---|---|---|
| 0 046 112 | 2/1982 | European Pat. Off. . |
| 0 147 770 | 7/1985 | European Pat. Off. . |
| 2 455 253 | 11/1980 | France . |
| 2 567 632 | 1/1986 | France . |

*Primary Examiner*—William Doerrler
*Attorney, Agent, or Firm*—Bacon & Thomas, PLLC

[57] ABSTRACT

A chiller for cooling a chilling fluid that feeds an air-conditioning system of a building, the chiller comprising firstly a boiler-separator for separating the two components of a refrigerant, one of which components is volatile, by heating and evaporation, and secondly a mixer for reforming the refrigerant by evaporation and absorption. The boiler-separator comprises a combustion chamber and a plurality of desorption-absorption enclosures extending concentrically around the combustion chamber, the outlet duct from the desorption portion or desorber of any one enclosure being connected to the inlet duct of the desorber of the immediately preceding enclosure via a first heat exchanger, the outlet duct of the desorber of the first enclosure and the inlet duct of the desorber of the last enclosure being connected to the mixer, and the outlet duct of the absorption portion of absorber of any one enclosure likewise being connected to the inlet duct of the absorber of the immediately following enclosure via a second heat exchanger, the inlet duct of the absorber of the first enclosure and the outlet duct of the absorber of the last enclosure being connected to the mixer.

12 Claims, 4 Drawing Sheets

CHILLER

TECHNICAL FIELD

The present invention relates to devices referred to herein as "chillers" and serving to lower the temperature of a chilling fluid passing through an air-conditioning system for domestic use (individual house or apartment block) or for industrial use (office or factory).

PRIOR ART

The idealized diagram of a chiller using a mixture of water and lithium bromide as the refrigerant is given in FIG. 1.

The operation of such a pump relies on two distinct operations. The first operation consists in using a separator 12 to separate the two components of the refrigerant mixture 10 which is itself made up of a dilute solution of lithium bromide, so as to obtain firstly a concentrated solution of lithium bromide (concentrate 14) and water (pure solvent 16), said separation being achieved by degrading a flow of heat from a high temperature source 18 (e.g. a combustion flame at more than 1,000° C.) and a heat sink 20 (e.g. constituted by ambient air at 30° C.). The second operation then consists in mixing the components back together again (in a mixer 22) so as to reform the initial refrigerant mixture 10 (the diluate) by re-evaporating a chilling fluid of the air-conditioning system 24 by pumping (the chilling fluid being constituted by glycol-containing water, for example, or any other liquid having a low freezing point) and by condensing and then mixing the vapor obtained in this way with the concentrated solution 14, such mixing releasing condensation-absorption heat at a temperature greater than that of the ambient air 20.

Water and lithium bromide chillers presently on the market nearly all comprise two desorption-condensation stages in the separator (which is why they are called double-effect chillers) each stage performing a thermal vaporization-condensation operation and being capable of accepting a maximum temperature of about 150° C. This maximum value can be explained by the fact that above said temperature any metal will corrode in the presence of an aqueous solution of lithium bromide.

OBJECT AND BRIEF SUMMARY OF THE INVENTION

The present invention seeks to provide a chiller making it possible to operate at temperatures higher than those presently acceptable and capable, in particular, of operating at up to 250° C. Another object of the invention is to improve the heat budget of present chillers and also to improve the energy efficiency thereof. Another object is to obtain a coefficient of performance (ratio of air-conditioning system power to heating power of the combustion) that is as high as possible, and preferably greater than two (which value must be compared with present values which are of the order of unity).

These objects are achieved by a chiller for cooling a chilling fluid that feeds an air-conditioning system of a building, the chiller comprising firstly a boiler-separator for separating the two components of a refrigerant, one of which components is volatile, by heating and evaporation, and secondly a mixer for reforming the refrigerant by evaporation and absorption, wherein the boiler-separator comprises a combustion chamber and a plurality of desorption-absorption enclosures extending concentrically around the combustion chamber, the outlet duct from the desorption portion or desorber of any one enclosure being connected to the inlet duct of the desorber of the immediately preceding enclosure via a first heat exchanger, the outlet duct of the desorber of the first enclosure and the inlet duct of the desorber of the last enclosure being connected to the mixer, and the outlet duct of the absorption portion of absorber of any one enclosure likewise being connected to the inlet duct of the absorber of the immediately following enclosure via a second heat exchanger, the inlet duct of the absorber of the first enclosure and the outlet duct of the absorber of the last enclosure being connected to the mixer.

The inlet duct of the desorber of the last enclosure is connected to the mixer via a first heat exchanger and the outlet duct of the desorber of the first enclosure is connected to the mixer via the set of first heat exchangers. Similarly, the outlet duct of the absorber of the last enclosure is connected to the mixer via a second heat exchanger and the inlet duct of the absorber of the first enclosure is connected to the mixer via the set of second heat exchangers.

The refrigerant is advantageously a mixture of water and lithium bromide, and the chilling fluid is a liquid having a low freezing threshold, such as glycol-containing water.

Depending on the desired pressures and temperatures, the boiler-separator may have two, three, or four desorption-absorption enclosures.

In a preferred embodiment, the first and second enclosures closest to the combustion chamber have walls made of resin-impregnated graphite. The graphite wall of the first enclosure in direct contact with the combustion flame may also be covered in a thin sheet of refractory metal.

Advantageously, the outermost enclosure of the boiler-separator includes a first circulation circuit connected to a device for cooling a high-temperature coolant, such as an air cooler, and the mixer includes an enclosure in thermal contact with a second circulation circuit connected to the air-conditioning system to cause the chilling fluid to circulate and with a third circulation circuit connected to the cooling device to cause the high-temperature coolant to circulate.

BRIEF DESCRIPTION OF THE DRAWING

Other characteristics and advantages of the present invention appear more clearly from the following description given by way of non-limiting indication and with reference to the accompanying drawings, in which.

DETAILED DESCRIPTION OF A PREFERRED EMBODIMENT

Figure 4:
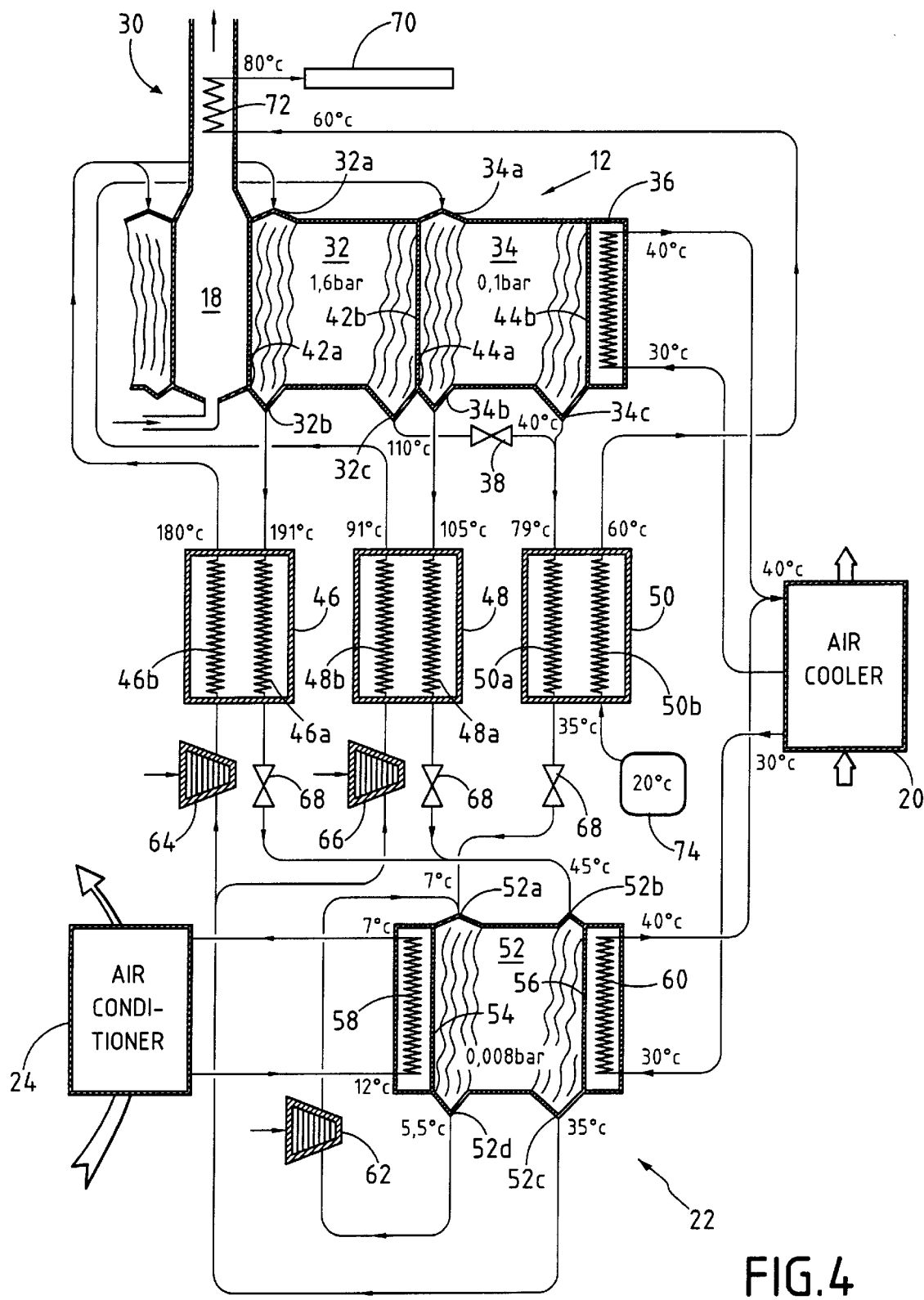
FIG. 4 shows an embodiment of a prior art double-effect chiller.

FIG. 4 shows in detail the structure of a prior art chiller having two desorption-condensation stages, referred to as a double-effect chiller, and operating in the manner described in the preamble.

The boiler-separator 30 is in the form of a conventional hot water boiler for a central heating system in a building, using a combustion chamber 18 formed by a vertical cylindrical enclosure surrounded by three concentric cylindrical enclosures. The outermost enclosure 36 conveys cooling water (acting as a high-temperature coolant) coming directly from an air cooler 20 and returning thereto after acquiring a higher temperature in the outer enclosure (e.g. going from 30° C. to 40° C.). Each of the two intermediate enclosures acts as a desorber-condenser, and they comprise a first enclosure 32 closer to the combustion chamber, and a second enclosure 34, both of them preferably being of small thickness (a few centimeters), serving to regenerate the diluted solution (the refrigerant or diluate), which is injected at the same concentration in parallel into top portions 32a and 34a of these two enclosures and referred to below in this description as the diluate inlet. This regeneration is performed by vaporizing the diluate running as a thin film over an inside wall 42a, 44a of each enclosure heated by the combustion flame. It will be observed that this streaming film technique has the advantage of leading to large heat transfer coefficients, and thus to small temperature differences (about 5° C.), thereby ensuring a high level of energy efficiency for the chiller. Under the effect of heat, the solvent (water) evaporates and condenses on an outer wall 42b, 44b of the enclosure opposite the above-mentioned inner wall. The concentrated solution (where the concentrate is lithium bromide) and the hot solvent are then collected separately at 32b, 32c; 34b, 34c at the bottoms of the enclosures (referred to below in this description as the concentrate outlet and the solvent outlet), respectively close to the inner wall 42a, 44a (concentrate outlet) and close to the outer wall 42b, 44b (solvent outlet), and they are directed to static heat exchangers 46, 48; 50 in which they serve in turn to heat the diluted solution and the cold solvent injected in counterflow into the heat exchangers.

The mixer 22 acts as an evaporator-absorber and is advantageously in the form of a vertical enclosure 52 having near its top a first inlet 52a receiving the pure solvent which streams down an inner wall 54 of the enclosure as a thin film and which evaporates as a result of the flow of low-temperature coolant flowing through the air-conditioning system 24 in a first heat exchange element 58 of this enclosure, thereby causing the diluted solution to reform on an opposite wall 56 on the basis of the concentrated solution received via a second inlet 52b. These first and second inlets are referred to below in this description respectively as the solvent inlet and as the concentrate inlet. The diluted solution is taken from the bottom portion of the enclosure 52 via a first outlet 52c referred to below as the diluate outlet and the non-evaporated and cooled remainder of the solvent is taken in turn from this bottom portion via a second outlet 52d referred to as the solvent outlet. The enclosure 52 has a second heat exchange element 60 therein conveying a high-temperature coolant coming directly from the air cooler 20 and returning thereto after increasing in temperature (from 30° C. to 40° C. in the example shown). It will be observed that in this enclosure, the solvent outlet is looped back to the solvent inlet via a circulation pump 62.

The first heat exchanger 46 includes both a first heat exchange element 46a having one of its two ends connected to the concentrate outlet 32b of the first enclosure 32, and having its other end connected to the concentrate inlet 52b of the enclosure 52 of the mixer 22, and also a second heat exchange element 46b having one of its two ends connected to the diluate outlet 52c of the enclosure 52 of the mixer 22 and having its other end connected to the diluate inlet 32a of the first enclosure 32.

The second heat exchanger 48 comprises both a first heat exchange element 48a having one of its two ends connected to the concentrate outlet 34b of the second enclosure 34 and having its other end also connected to the concentrate inlet 52b of the enclosure 52 of the mixer 22, and also a second heat exchange element 48b having one of its two ends also connected to the diluate outlet 52c of the enclosure 52 of the mixer 22 and its other end connected to the diluate inlet 34a of the second enclosure 34.

The third heat exchanger 50 comprises both a first heat exchange element 50a having one of its two ends connected to the solvent outlets 32c and 34c of the first and second enclosures 32 and 34 (with a valve 38 being placed, for example, at the outlet of the first enclosure to enable the heat exchanger temperature to be adjusted by controlling the amount of solvent coming from one or the other of the enclosures), with its other end being connected to the solvent inlet 52a of the enclosure 52 of the mixer 22, and also a second heat exchange element 52b having one of its two ends connected to a domestic hot water circuit 70 via a flue gas recuperator 72 of the combustion chamber 18, while its other end is connected to a supply 74 for feeding the hot water circuit, e.g. from mains water at 20° C.

Naturally, pumps 64 and 66 and valves 68 are provided to facilitate the flow of refrigerant between the enclosure 52 and the various heat exchangers 46, 48, and 50.

Assuming that the first enclosure of the boiler-separator operates at a pressure of 1.6 bars, that the second enclosure operates at a pressure of 0.1 bars, and that the mixer operates at a pressure of 0.008 bars (6.1 mmHg), and adopting a concentration of lithium bromide in the concentrate of xc=0.62 and in the diluate of xd=0.58, it can be shown that the wall temperatures of such a prior art chiller reach the following values: 140° C. to 155° C. for the wall 42a between the combustion chamber and the first enclosure 32; 85° C. to 95° C. for the linking wall 42b–44a between the first and second enclosures; and 40° C. to 45° C. for the wall 44b between the second enclosure and the outer enclosure 36. The temperatures obtained at various points in the chiller are marked on FIG. 4.

A heat and mass balance performed on that chiller serves to determine the heat powers transmitted between the various elements. Thus, by selecting an initial fuel power of 50 kW and by assuming that the efficiency of the combustion chamber is 85%, it can be deduced that the separator receives 42.5 kW. It delivers 30 kW thereof to the high-temperature coolant which dumps them to the atmosphere via the air cooler. The mixer pumps 64 kW in the low-temperature coolant (the chilling fluid) which comes from the air-conditioning system, and it returns 76.5 kW into the high-temperature coolant which dumps them likewise to the atmosphere via the air cooler. It will be observed that the first and second heat exchangers 46 and 48 placed in counterflow between the diluates and the concentrates have high respective powers of 66.5 kW and of 23.5 kW respectively. Finally, the water taken at 20° C. receives 5 kW from the third heat exchanger 50 (which receives the hot solvent coming from the separator) and an additional 2.5 kW from the flue gas recuperator 70 which receives 7.5 kW from the combustion chamber.

Figure 1:
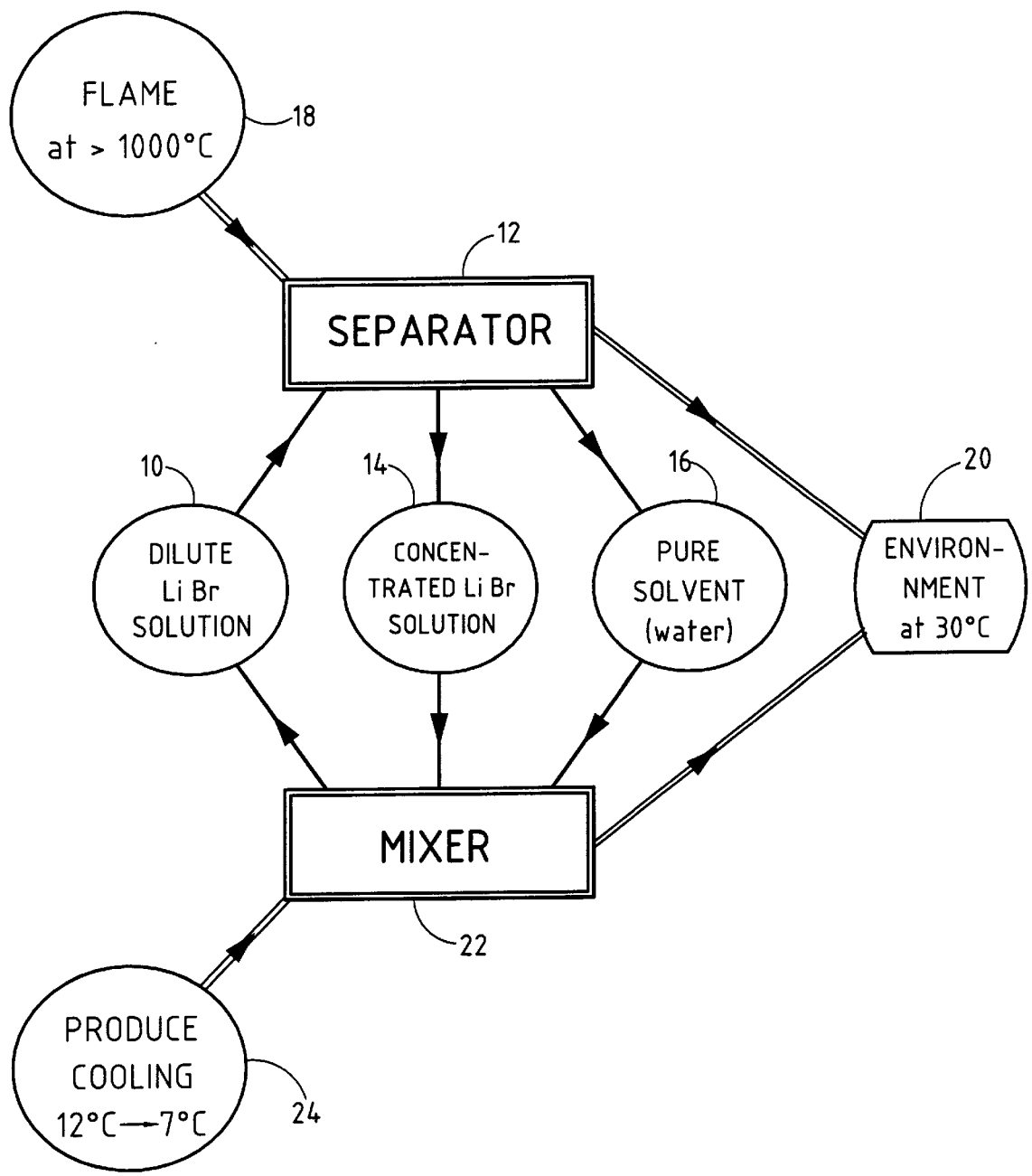
FIG. 1 is an idealized diagram of a chiller.
Figure 2:
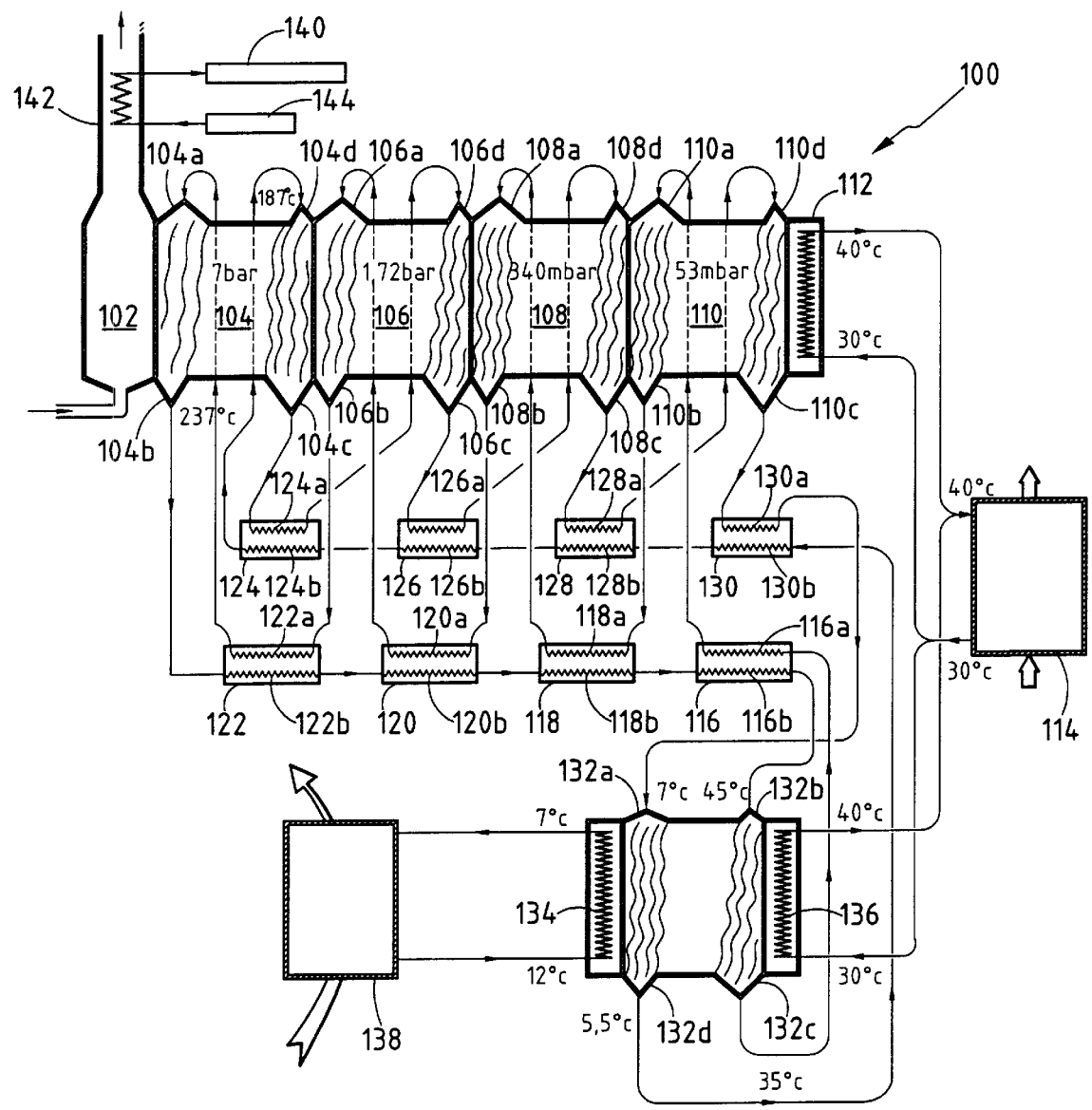
FIG. 2 shows an embodiment of a quadruple-effect chiller of the invention.

FIG. 2 shows an embodiment of a chiller of the invention. This chiller is a quadruple-effect pump, but clearly a triple-effect chiller implementing the principles of the invention could also be envisaged. These principles rely no longer on using two desorption-condensation stages or cells fed in parallel, as in the prior art, but on using a plurality of desorption-absorption cells connected in series. The idea is no longer only to use the effect of heat to cause solvent to condense in each cell on the wall opposite to the wall over which it is flowing, and to collect the components separated in this way for taking to the mixer, but also to cause the water vapor coming from this diluate to be absorbed in a concentrate streaming down said opposite wall, and then to repeat this operation in the following cell using the collected concentrates.

Nevertheless, the boiler-separator 100 can likewise be in the form of a conventional hot water boiler with a combustion chamber 102 formed by a vertical cylindrical enclosure and surrounded by a plurality of concentric cylindrical enclosures with the outermost enclosure 112 conveying the high-temperature coolant (advantageously constituted merely by cooling water at 20° C.) which comes directly from a cooling device such as an air cooler 114 and which returns thereto after rising in temperature. The four intermediate enclosures 104, 106, 108, and 110 each acting as a desorber-absorber serve to regenerate the refrigerant which is initially injected in diluted form (the diluate) to the desorber of the enclosure 110 immediately adjacent to the outermost enclosure (the fourth enclosure in this quadruple-effect chiller) via a diluate inlet 110a situated in the top portion of said enclosure, after which it passes successively through each of the enclosures in which it is progressively heated, finally leaving in concentrated form from the desorber of the first enclosure 104 (the enclosure closest to the combustion chamber) via a concentrate outlet 104b in the bottom thereof. In parallel, the same refrigerant, but in concentrated form (the concentrate) follows the opposite path, being injected into the absorber of the first enclosure 104 via a concentrate inlet 104d situated in the top thereof, and leaving via a diluate outlet 110c in the bottom of the absorber of the fourth enclosure 110 after passing successively through the intermediate enclosures where it is, on the contrary, cooled. In addition, four static heat exchangers 116, 118, 120, and 122 are placed between the enclosures, and more precisely between the concentrate outlet of the desorber of one enclosure and the diluate inlet of the desorber of the immediately adjacent enclosure, to heat the diluate as it progresses through the enclosures, and four other static heat exchangers 124, 126, 128, and 130 are also placed between the enclosures, and more precisely between the diluate outlet of the absorber of one enclosure and the concentrate inlet of the absorber of the immediately adjacent enclosure to cool the concentrate as it progresses (as a counterflow) through said enclosures.

The mixer likewise includes a desorption-absorption cell and may advantageously be in the form of a vertical enclosure 132 having in its top a diluate inlet 132a and a concentrate inlet 132b. The diluate is taken from the bottom portion of the enclosure via a diluate outlet 132c, and the concentrate is taken from the bottom of the enclosure via a concentrate outlet 132d. As before, the low-temperature coolant (also referred to as the chilling fluid) that passes through the air-conditioning system 138 also passes through the enclosure 132 via a first heat exchange element 134, and the high-temperature coolant that passes through the air cooler 114 also passes therethrough via a second heat exchange element 136.

The first heat exchanger 116 comprises both a first heat exchange element 116a having one of its two ends connected to the diluate outlet 132c of the mixer enclosure 132, with its other end being connected to the diluate inlet 110a of the desorber of the fourth enclosure 110, and also a second heat exchange element 116b having one of its two ends connected to the concentrate inlet 132b of the mixer enclosure 132, with its other end being connected to the outlet of the second heat exchange element 118b of the second heat exchanger 118.

The second heat exchanger 118 comprises firstly a first exchange element 118a having one of its two ends connected to the concentrate outlet 110b of the desorber of the fourth enclosure 110, its other end being connected to the diluate inlet 108a of the desorber of the third enclosure 108, and secondly a second heat exchange element 118b having one of its two ends connected to the inlet of the second exchange element 116b of the first heat exchanger 116, and having its other end connected to the outlet of the second exchange element 120b of the third heat exchanger 120.

The third heat exchanger 120 comprises firstly a first exchange element 120a having one of its two ends connected to the concentrate outlet 108b of the desorber of the third enclosure 108, its other end being connected to the diluate inlet 106a of the desorber of the second enclosure 106, and secondly a second heat exchange element 120b having one of its two ends connected to the inlet of the second exchange element 118b of the second heat exchanger 118, and having its other end connected to the outlet of the second exchange element 122b of the fourth heat exchanger 122.

The fourth heat exchanger 122 comprises firstly a first exchange element 122a having one of its two ends connected to the concentrate outlet 106b of the desorber of the second enclosure 106, its other end being connected to the diluate inlet 104a of the desorber of the first enclosure 104, and secondly a second heat exchange element 122b having one of its two ends connected to the inlet of the second exchange element 120b of the third heat exchanger 120, and having its other end connected to the concentrate outlet 104b of the desorber of the first enclosure 104.

The fifth heat exchanger 124 comprises firstly a first heat exchange element 124a having one of its two ends connected to the diluate outlet 104c of the absorber of the first enclosure 104, its other end being connected to the concentrate inlet 106d of the absorber of the second enclosure 106, and secondly a second exchange element 124b having one of its two ends connected to a concentrate inlet 104d of the first enclosure 104, its other end being connected to the outlet of the second exchange element 126b of the sixth heat exchanger 126.

The sixth heat exchanger 126 comprises firstly a first heat exchange element 126a having one of its two ends connected to the diluate outlet 106c of the absorber of the second enclosure 106, its other end being connected to the concentrate inlet 108d of the absorber of the third enclosure 108, and secondly a second exchange element 126b having one of its two ends connected to the inlet of the second exchange element 124b of the fifth heat exchanger 124, its other end being connected to the outlet of the second exchange element 128b of the seventh heat exchanger 128.

The seventh heat exchanger 128 comprises firstly a first heat exchange element 128a having one of its two ends connected to the diluate outlet 108c of the absorber of the third enclosure 108, its other end being connected to the concentrate inlet 110d of the absorber of the fourth enclosure 110, and secondly a second exchange element 128b having one of its two ends connected to the inlet of the second exchange element 126b of the sixth heat exchanger 126, its other end being connected to the outlet of the second exchange element 130b of the eighth heat exchanger 130.

The eighth heat exchanger 130 comprises firstly a first heat exchange element 130a having one of its two ends connected to the diluate outlet 110c of the absorber of the fourth enclosure 110, its other end being connected to the diluate inlet 132a of the mixer enclosure 132, and secondly a second exchange element 130b having one of its two ends connected to the inlet of the second exchange element 128b of the seventh heat exchanger 128, its other end being connected to the concentrate outlet 132d of the mixer enclosure 132. It will be observed that the system operates in a closed circuit, the refrigerant being decomposed and recomposed in alternation and consequently, that if it is desired to make a hot water circuit 140 available as on the prior art chiller, then this circuit preferably passes via the flue gas recuperator circuit 140 of the combustion chamber 102 starting from a source, e.g. mains water 144.

Naturally, pumps and valves (not shown) are provided to facilitate circulation of the refrigerant between the various elements of the chiller.

The temperatures and pressures to be found in the enclosures of the boiler-separator as shown in FIG. 2 demonstrate that it is possible in this way with the structure of the invention to obtain a quadruple-effect chiller having concentrate temperatures of the order of 250° C. while remaining within acceptable maximum pressures (7 bars in the first enclosure).

Figure 3:
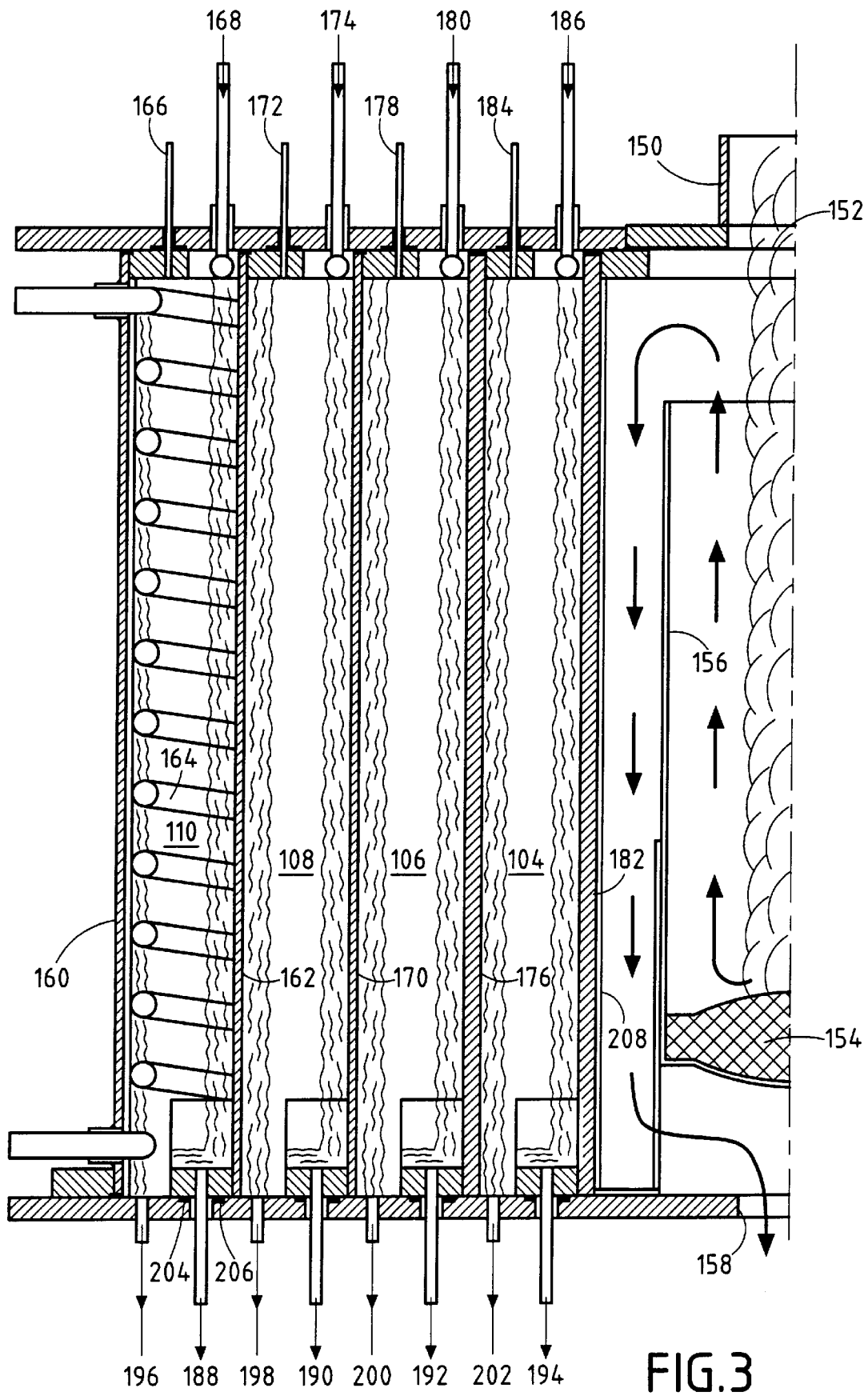
FIG. 3 shows a detail of a boiler-separator of the FIG. 2 chiller.

The structure of a boiler-separator implemented in the invention is shown in FIG. 3. It is cylindrical in shape with a gas or oil burner (not shown) being located on the longitudinal axis thereof. Reference 150 designates a support for the burner and reference 152 designates a thermal protection disk. A disk of refractory material 154 fixed to a coaxial tubular separation wall 156 subdivides the combustion zone, and in particular separates the end of the flame from a flue gas evacuation orifice 158. Concentric enclosures are disposed regularly around the combustion hearth between the tubular wall and an outer wall 160. A first wall 162 co-operates with the outer wall to form the fourth enclosure 110 in which a tube wound with non-touching turns (coil 164) is located and has the high-temperature coolant flowing therethrough in a counterflow. The diluate and the concentrate are injected into this fourth enclosure via a plurality of feed ducts 168 and 166 located at the top of the first wall and of the outer wall respectively. Similarly, a second wall 170 co-operates with the first wall to form the third enclosure 108 which likewise has feed ducts 174 and 172 respectively injecting diluate and concentrate. In a triple-effect chiller, a third wall 176 is provided that co-operates with the second wall to form the second enclosure 106 which is provided with feed ducts 180 and 178 for diluate and concentrate. Finally, in the example shown which corresponds to a quadruple-effect chiller, a fourth wall 182 closest to the combustion chamber is also provided to co-operate with the third wall to form the first enclosure 104 suitable for receiving diluate and concentrate via respective ducts 186 and 184. At the bottoms of these walls, concentrate collection ducts 188, 190, 192, and 194, and diluate collection ducts 196, 198, 200, and 202 serve to recover these elements. Naturally, seals, e.g. 204, 206 are provided to prevent any mixing taking place between the diluate and the concentrate within a single enclosure or between two adjacent enclosures.

The first and second enclosures which are closer to the combustion chamber preferably have walls made of resin-impregnated graphite. This makes it possible to obtain thermal protection up to 400° C. Where necessary, the graphite wall of the first enclosure which is in direct contact with the combustion flame, may be covered in a thin sheet of refractory metal 208.

We claim:

1. A chiller for cooling a chilling fluid to be supplied to an air-conditioning system of a building, the chiller comprising:
    a boiler-separator for separating two components of a refrigerant by heating and evaporation, one of the components being volatile, the boiler-separator including a combustion chamber and a plurality of desorption-absorption enclosures which extend concentrically around the combustion chamber and have heat transferring walls, each of the desorption-absorption enclosures having a respective desorption portion and a respective absorption portion, each of the desorption portions and each of the absorption portions having a respective inlet duct and respective outlet duct;
    a mixer for reforming the refrigerant by evaporation and absorption;
    a plurality of first heat exchangers; and
    a plurality of second heat exchangers;
    wherein the desorption-absorption enclosures are structurally connected in series such that the outlet duct of each of the desorption portions is connected to the inlet duct of the desorption portion of an immediately proceeding desorption-absorption enclosure via one of the first heat exchangers, the outlet duct of the desorption portion of a first of the desorption-absorption enclosures and the inlet duct of the desorption portion of a last of the desorption enclosures are connected to the mixer, the outlet duct of the absorption portion of each of the absorption portions is connected to the inlet duct of the absorption portion of an immediately following desorption-absorption enclosure via one of the second heat exchangers, and the inlet duct of the absorption portion of the first of the desorption-absorption enclosures and the outlet duct of the absorption portion of the last of the desorption-absorption enclosures are connected to the mixer.

2. A chiller according to claim 1, wherein the inlet duct of the desorption portion of the last of the desorption-absorption enclosures is connected to the mixer via one of the first heat exchangers.

3. A chiller according to claim 2, wherein the outlet duct of the desorption portion of the first of the desorption-absorption enclosures is connected to the mixer via all of the first heat exchangers.

4. A chiller according to claim 1, wherein the outlet duct of the absorption portion of the last of the desorption-absorption enclosures is connected to the mixer via one of the second heat exchangers.

5. A chiller according to claim 4, wherein the inlet duct of the absorption portion of the first of the desorption-absorption enclosures is connected to the mixer via all of the second heat exchangers.

6. A chiller according to claim 1, wherein the refrigerant is a mixture of water and lithium bromide.

7. A chiller according to claim 6, wherein the chilling fluid is a liquid having a low freezing threshold such as glycol-containing water.

8. A chiller according to claim 1, wherein the boiler-separator includes three desorption-absorption enclosures.

9. A chiller according to claim 1, wherein the boiler-separator includes four desorption-absorption enclosures.

10. A chiller according to claim 9, wherein two of the desorption-absorption enclosures which are closest to the combustion chamber have walls of resin-impregnated graphite.

11. A chiller according to claim 10, wherein the resin-impregnated graphite wall of the desorption-absorption enclosure closest to the combustion chamber which is in direct contact with a combustion flame of the combustion chamber is covered in a thin sheet of refractory metal.

12. A chiller according to claim 1, wherein a desorption-absorption enclosure which is farthest from the boiler-separator includes a first circulation circuit connected to a cooling device for cooling a high-temperature coolant; and
    wherein the mixer includes an enclosure, the enclosure being in thermal contact with a second circulation circuit connected to the air-conditioning system to cause the chilling fluid to circulate and in thermal contact with a third circulation circuit connected to the cooling device to cause the high-temperature coolant to circulate.

* * * * *